(12) United States Patent
Haussmann (10) Patent No.: US 11,039,114 B2
(45) Date of Patent: Jun. 15, 2021

(54) METHOD FOR DETERMINING DISTANCE INFORMATION FROM IMAGES OF A SPATIAL REGION

(71) Applicant: PILZ GMBH & CO. KG, Ostfildern (DE)

(72) Inventor: Joerg Haussmann, Ostfildern (DE)

(73) Assignee: Pilz GmbH & Co. KG, Ostfildern (DE)

( * ) Notice: Subject to any disclaimer, the term of this patent is extended or adjusted under 35 U.S.C. 154(b) by 0 days.

(21) Appl. No.: 16/908,122

(22) Filed: Jun. 22, 2020

(65) Prior Publication Data

US 2020/0374503 A1 Nov. 26, 2020

Related U.S. Application Data

(63) Continuation of application No. PCT/EP2018/085562, filed on Dec. 18, 2018.

(30) Foreign Application Priority Data

Dec. 21, 2017 (DE) ...................... 10 2017 130 897.0

(51) Int. Cl.
*H04N 13/128* (2018.01)
*H04N 13/243* (2018.01)
(Continued)

(52) U.S. Cl.
CPC .......... *H04N 13/128* (2018.05); *B25J 9/1674* (2013.01); *F16P 3/142* (2013.01);
(Continued)

(58) Field of Classification Search
None
See application file for complete search history.

(56) References Cited

U.S. PATENT DOCUMENTS

2009/0129666 A1* 5/2009 Goevert .................. G06T 7/593
382/154
2010/0150455 A1 6/2010 Oyama
(Continued)

FOREIGN PATENT DOCUMENTS

DE 10 2008 020 326 B3 9/2009
WO WO-2007107214 A2 9/2007

*Primary Examiner* — Christopher Braniff
(74) *Attorney, Agent, or Firm* — Harness, Dickey & Pierce, P.L.C.

(57) ABSTRACT

A method includes defining a disparity range having discrete disparities and taking first, second, and third images of a spatial region using first, second, and third imaging units. The imaging units are arranged in an isosceles triangle geometry. The method includes determining first similarity values for a pixel of the first image for all the discrete disparities along a first epipolar line associated with the pixel in the second image. The method includes determining second similarity values for the pixel for all discrete disparities along a second epipolar line associated with the pixel in the third image. The method includes combining the first and second similarity values and determining a common disparity based on the combined similarity values. The method includes determining a distance to a point within the spatial region for the pixel from the common disparity and the isosceles triangle geometry.

20 Claims, 6 Drawing Sheets

(51) Int. Cl.
*F16P 3/14* (2006.01)
*G01C 3/14* (2006.01)
*G01C 11/30* (2006.01)
*H04N 13/00* (2018.01)
*B25J 9/16* (2006.01)
*G01V 8/20* (2006.01)

(52) U.S. Cl.
CPC ............... *G01C 3/14* (2013.01); *G01C 11/30* (2013.01); *G01V 8/20* (2013.01); *H04N 13/243* (2018.05); *H04N 2013/0081* (2013.01)

(56) References Cited

U.S. PATENT DOCUMENTS

| | | |
|---|---|---|
| 2016/0165216 A1 | 6/2016 | Wu et al. |
| 2016/0309134 A1 | 10/2016 | Venkataraman et al. |
| 2017/0359565 A1 | 12/2017 | Ito |

* cited by examiner

METHOD FOR DETERMINING DISTANCE INFORMATION FROM IMAGES OF A SPATIAL REGION

CROSS-REFERENCE TO RELATED APPLICATIONS

This application is a continuation of International Patent Application No. PCT/EP2018/085562 filed on Dec. 18, 2018, which claims priority to German Patent Application No. 10 2017 130 897.0 filed on Dec. 21, 2017. The entire disclosures of the applications referenced above are incorporated by reference.

FIELD

The present disclosure relates to a method for determining distance information from images of a spatial region and a corresponding apparatus. Furthermore, the disclosure relates to the use of such apparatus for safeguarding a hazardous area of a technical installation.

BACKGROUND

Distance information of objects in a spatial region can be determined by offset images of the spatial region. The offset (disparity) between the projections of an object in the offset images depends on the distance of the object to the imaging units, so that with a known offset the distance to an object can be determined by triangulation using the imaging geometry.

To determine the offset, corresponding elements must be found in the offset images. This process is called correspondence analysis. While finding corresponding elements in different images is easy for humans, it is a great challenge for a computer. Therefore, assignment errors can occur, which ultimately lead to incorrectly measured distances.

In standard stereo systems, i.e. systems in which a stereo image taken with two sensors is used, the assignment problems between the left image and right images are countered with complex algorithms for correspondence analysis. Despite all efforts, however, assignment problems cannot be completely excluded or reliably reduced to a tolerable level. It is therefore necessary, especially for safety-critical applications where a distance must be reliably detected at least in a defined range, to take additional measures to verify the measured distance.

One way to improve the assignment quality is to add a further sensor to form another stereo pair to perform a complementary distance measurement. The determined distance values of both stereo pairs are then used to check the results of the other stereo pair respectively. In this way, an attempt is made to reduce the overall assignment problems. If the determined distance values are equal, it can be assumed that the distance is correct. However, if the results differ, a complex decision-making process must either determine the priority of one of the results or rejection of both results. Both require post-processing of the results, which significantly increases the complexity of the evaluation software.

SUMMARY

It is an object of the present disclosure to provide a method and a corresponding apparatus that enable an accurate disparity search. Further, it is an object to provide a method a corresponding apparatus that can be implemented easily and efficiently. Furthermore, it is an object to provide a method and a corresponding apparatus that do not require complex post-processing.

The object is solved by a method for determining distance information from images of a spatial region, comprising:
  arranging a first imaging unit, a second imaging unit, and third imaging unit in a defined imaging geometry, in which the imaging units form an isosceles triangle;
  defining a disparity range having a number of discrete disparities;
  taking images of the spatial region, wherein a first image is taken with the first imaging unit, a second image is taken with the second imaging unit, and a third image is taken with the third imaging unit;
  determining first similarity values for at least one pixel of the first image for all discrete disparities in the defined disparity range along a first epipolar line associated with the pixel in the second image;
  determining second similarity values for the at least one pixel of the first image for all discrete disparities in the defined disparity range along a second epipolar line associated with the pixel in the third image;
  combining the first similarity values with the second similarity values;
  determining a common disparity between the first image, the second image, and the third image for the at least one pixel based on the combined similarity values; and
  determining a distance to a point within the spatial region for the at least one pixel from the common disparity and the defined acquisition geometry.

According to a further aspect of the present disclosure, the object is solved by an apparatus for determining distance information from an image of a spatial region, comprising a first imaging unit for taking a first image of the spatial region, a second imaging unit for taking a second image of the spatial region, and a third imaging unit for taking a third image of the spatial region, wherein the first imaging unit, the second imaging unit, and the third imaging unit are arranged in a defined imaging geometry in which the imaging units form an isosceles triangle, and an image processing unit configured to determine, within the defined disparity range having a number of discrete disparities, first similarity values and second similarity values for at least one pixel of the first image, wherein the image processing unit is configured to determine the first similarity values for the at least one pixel for all discrete disparities in the defined disparity range along a first epipolar line in the second image associated with the pixel, and determine the second similarity values for the at least one pixel for all discrete disparities in the defined disparity range along a second epipolar line in the third image associated with the pixel, wherein the image processing unit is further configured to combine the first similarity values with the second similarity values, determine a common disparity for the at least one pixel between the first image, the second image, and the third image based on the combined similarity values, and determine a distance to a point within the spatial region for the at least one pixel from the common disparity and the defined imaging geometry.

It is thus an idea of the claimed solution to determine distance information for a spatial region by means of three imaging units. However, instead of performing two stereo correspondence analyses for two feasible stereo pairs, an extended correspondence analysis is performed, in which the similarity values from the image pairs in question are first combined and then jointly evaluated. Thus, not two individual distance measurements are performed, the results of which being subsequently merged and compared, but only a single distance measurement, which, however, combines and equally considers the information of the imaging units.

This is possible due to a suitable epipolar geometry. The imaging units are arranged in a defined imaging geometry, in which two adjacent imaging units each generate an image pair in epipolar geometry and equal object distances in all image pairs lead to the same disparities. In particular, the distance (base widths) between the first imaging unit and the second imaging unit, and the distance between the first imaging unit and the third imaging unit are equal, so that the imaging units form an isosceles (in special cases equilateral) triangle. The taken images are then in a relationship to each other, which allows a simple linking of the information from all imaging units. In other words, the correspondence analysis already makes use of extended information, which results from combining of the similarity values of the individual pairs of images.

As with known methods that use three imaging units, at least two data sets with similarity values are generated for two stereo image pairs. However, a subsequent disparity determination is not carried out separately for each individual data set, but based on an aggregation of both data sets. Due to the suitable epipolar geometry resulting from the defined imaging geometry, the aggregation can easily be achieved by means of a simple arithmetic operation.

Due to the aggregation of the similarity values before the actual correspondence analysis, an additional aggregation step and thus an additional calculation step is necessary for the correspondence analysis. However, it has been shown that the additional aggregation step can be implemented more easily than a complex post-processing. Since the aggregation is a simple operation that is applied equally to all similarity values, this additional calculation step can be implemented with less computational effort than a post-processing of two separately determined distance information with a large number of comparison steps and decision steps. The implementation can thus be simplified overall.

The disclosed method thus enables a good assignment quality with manageable level of complexity.

In a various embodiments, the imaging units can be arranged in an isosceles, right-angled triangle in the defined imaging geometry.

By the arrangement in a right-angled triangle, with one imaging unit at the apex of the triangle and the other two imaging units at the end of the equal-length legs, the aggregation of similarity values can be further simplified. An extended correspondence analysis can thus be realized easily, since the epipolar lines are perpendicular to each other. In various embodiments, the epipolar lines may also be perpendicular to the respective image edges.

In a further refinement, the first similarity values are determined by comparing the at least one pixel of the first image and its surroundings with each pixel and its surroundings within the defined disparity range along the first epipolar line in the second image, and wherein the second similarity values are determined by comparing the at least one pixel of the first image and its surroundings with each pixel and its surroundings within the defined disparity range along the second epipolar line in the third image.

In this refinement, a local aggregation is performed to determine the similarity values. In this way, a reliable correspondence analysis becomes possible, whereby the resulting similarity values can be easily combined. For the comparison of the at least one pixel and its surroundings with each pixel and its surroundings along the first and second epipolar line the sum of absolute differences or quadratic differences can be used.

In a further refinement, the first similarity values are added to the second similarity values.

In this refinement, the aggregation is achieved by simply adding the first and second similarity values. In other words, the similarity values determined in a defined disparity range for a defined number of discrete disparities for a pixel of the first image with respect to the second image are each added to the values determined for the same disparities for a pixel with respect to the third image. Performing and addition is a simple arithmetic operation that can be implemented quickly and in a resource-saving manner. The refinement thus contributes further to an efficient implementation of the method.

In a further refinement, determining the common disparity for the at least one pixel includes an extreme value search in the combined similarity values, in particular a search for a minimum.

In this refinement, the disparity is determined by means of an extreme value search within the combined similarity values. Thus, for determining the disparity form the combined disparity values the same approach can be used as for known stereo correspondence analyses. The implementation of the method is simplified, since existing algorithms can be reused.

In a further refinement, the first image, the second image, and the third image are transformed to each other so that the first epipolar line extends along a first axis and the second epipolar line extends along a second axis perpendicular to the first epipolar line.

In this refinement, the alignment of the images to each other in the defined imaging geometry can be further optimized. In various embodiments, the first image, the second image, and the third image each can have an equal number of pixel lines and an equal number of pixel columns, wherein the first epipolar line extends along a pixel line in the second image corresponding to the pixel line of the first image in which the at least one pixel is located, and wherein the second epipolar line extends along a pixel column in the third image corresponding to the pixel column of the first image in which the at least one pixel is located. In this refinement, the images can be processed in rows and columns, which makes image processing simple and efficient.

In a further refinement, a common disparity is determined for all pixels of the first image. Alternatively, a common disparity can be determined for only a defined number of pixels of the first image. While one refinement allows the highest possible resolution of a depth map, the other refinement allows the depth value determination to be limited to only relevant areas of an image, which allows a faster calculation of only relevant areas.

In a further refinement, the method further comprises determining third similarity values for at least one further pixel of the second image for all discrete disparities in a defined disparity range along a first epipolar line in the first image associated with the further pixel, determining fourth similarity values for the at least one further pixel of the second image for all discrete disparities in the defined disparity range along a second epipolar line in the third image associated with the further pixel, and determining further distance information from the third and fourth similarity values.

In this refinement, at least one further distance information is thus determined by using one of the other two images as a reference image, wherein third and fourth similarity values are determined based on the selected reference image and used to determine a further distance information. Determining the further distance information may also involve aggregation of the third similarity values and the fourth similarity values and determining another common disparity. Alternatively, the further distance information can be determined from the third similarity values and the fourth similarity values in a conventional way. Thereby, not only redundant distance information can be determined, but also diversity of the process can be increased. Overall, the refinement allows verifying the determined distance information in a simple manner. It is understood that a further increase in quality can be achieved by using each of the images of the first, second and third imaging unit as a reference image.

It is understood that the features mentioned above and the features to be explained below can be used not only in the combination indicated, but also in other combinations or uniquely, without leaving the scope of this disclosure.

BRIEF DESCRIPTION OF THE DRAWINGS

Embodiments of the invention are shown in the drawings and are explained in more detail in the following description.

DETAILED DESCRIPTION

Figure 1:
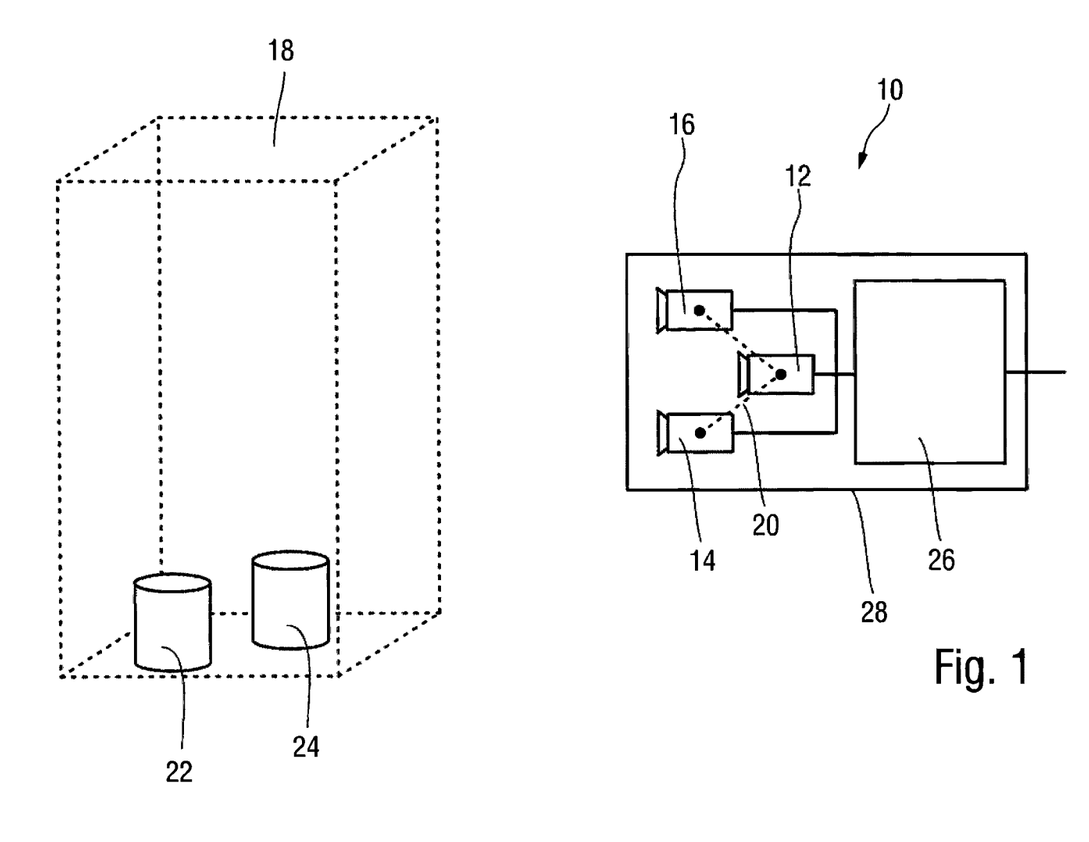
FIG. 1 shows a schematic view of an apparatus according to an example embodiment.

In FIG. 1, an apparatus according to an example embodiment is denoted in its entirety with reference numeral 10.

In this example embodiment, the apparatus 10 comprises three imaging units 12, 14, 16, each of which is designed to take an image of a spatial region 18 laying in front of the units. The imaging units 12, 14, 16 can be digital camera units with one optic each for projecting the spatial region 18 onto an image sensor of the camera unit. Each point in space in the spatial region 18 is uniquely assigned to a pixel of the image sensor. The imaging units 12, 14, 16 can be complete, independently functioning cameras, or a combined unit, in which individual parts of the imaging units are used together, so that they essentially act as three separate image sensors with associated optics.

The three imaging units 12, 14, 16 are arranged in a defined imaging geometry 20, which is indicated here by the dashed lines. In the defined imaging geometry 20, one of the imaging units 12 forms a central unit from which the other two imaging units 14, 16 are arranged at an equal distance. The imaging units 12, 14, 16 thus form an isosceles triangle, with the imaging units forming the vertices of this triangle.

The imaging units 12, 14, 16 can form a right-angled, isosceles triangle. The central imaging unit 12 sits at the apex and the other two imaging units 14, 16 are located in the remaining corners of the triangle. The legs of the triangle enclose an angle of 90°.

From the offset images of the spatial region 18 provided by the imaging units 12, 14, 16, distance information of objects 22, 24 in the spatial region 18 can be determined, since the offset between the projections of the objects 22, 24 in the offset images depends on the distance of the objects 22, 24 to the imaging units 12, 14, 16. By means of triangulation, the distance to objects 22, 24 can be determined from the known offset using the imaging geometry 20. In addition to the distance to an object 22, 24, the relative position of the objects 22, 24 to each other can also be determined without further sensors.

The processing of the images of the imaging units 12, 14, 16 according to the example embodiment shown here is carried out by an image processing unit 26, which determines the distance information to the individual objects 22, 24, which are located in the spatial region 18, from the images. For this purpose, the image processing unit 26 forms at least two image pairs from the images of the three imaging units 12, 14, 16 and determines a set of similarity values for each pair. Due to the defined arrangement of the imaging units 12, 14, 16, the similarity values of the image pairs can be directly combined with each other, which enables a joint evaluation of the similarity values, which is explained in more detail below.

The joint evaluation of the similarity values enables an accurate disparity determination, wherein time-consuming post-processing is not necessary. The method is thus essentially a one-step process, using an extended correspondence analysis that can take into account the information from several sensors. Compared to a two-step process having two distance determination processes and a subsequent plausibility check, the software implementation can be simplified, which especially facilitates porting the method to architectures designed for linear processing without many control structures, such as an FPGA.

In various embodiments, the image processing unit 26 can be a FPGA. Furthermore, the image processing unit 26 can be enclosed together with the imaging units 12, 14, 16 in a common housing 28. It is understood that in other embodiments, the image processing unit 26 can also be a separate unit outside the housing 28.

Figure 2:
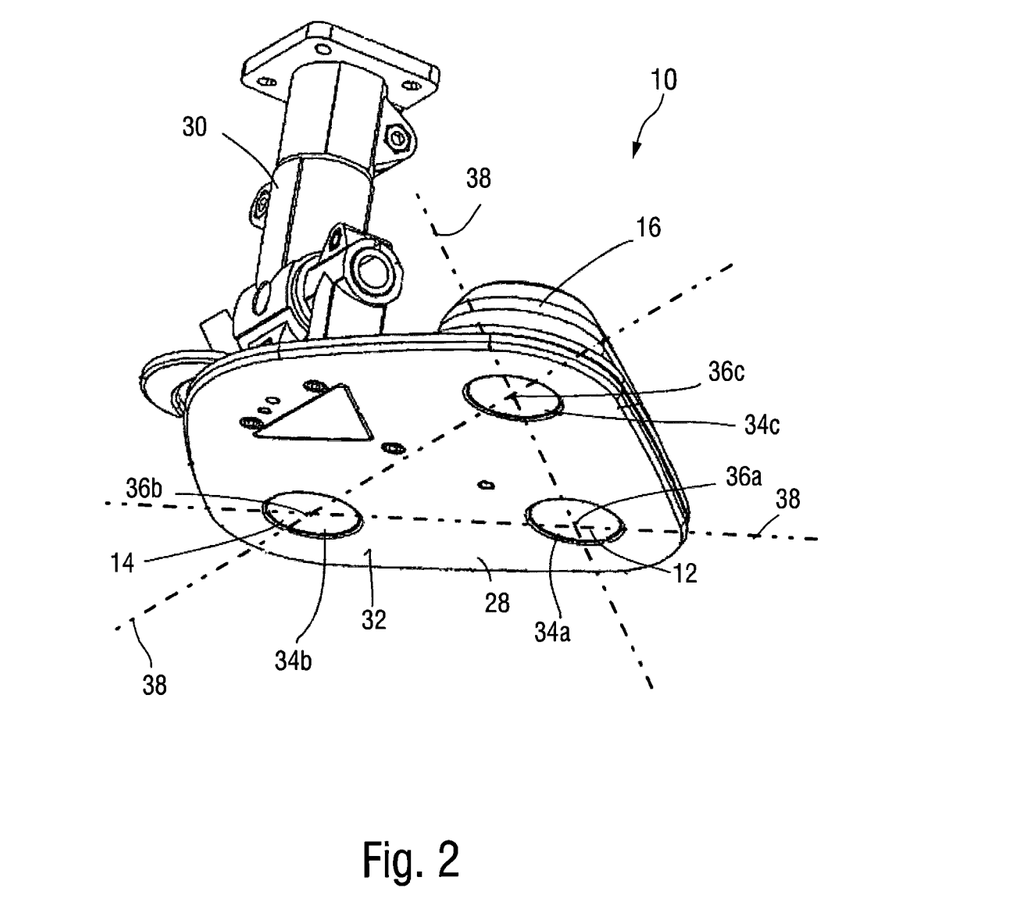
FIG. 2 shows a perspective of an apparatus according to an example embodiment.

FIG. 2 shows an apparatus according to an example embodiment of the disclosure in a perspective view, in particular the integration of the three imaging units 12, 14, 16 and the image processing unit 26 in a common housing 28. Same reference signs here designate the same parts as previously in FIG. 1.

The apparatus 10 is integrated in a housing 28 and mountable on a wall, a mast or the like via a mounting part 30. A base 32 of the apparatus facing the monitoring spatial region (not shown here) has three openings 34a, 34b, 34c, behind which the three imaging units 12, 14, 16 are located inside the housing 28. The optics of the imaging units 12, 14, 16 are located directly behind the central openings 36a, 36b, 36c.

The connecting lines 38 through the openings 36 form an isosceles triangle in the base 32, which represents the defined imaging geometry 20. The distance from the first imaging unit 12 to the second imaging unit 14 is thus equal to the distance from the first imaging unit 12 to the third imaging unit 16. As shown here, the defined imaging geometry 20 can also be a right-angled, isosceles triangle, i.e. the angle formed by the straight lines at the opening 36a is a 90° angle.

Figure 3:
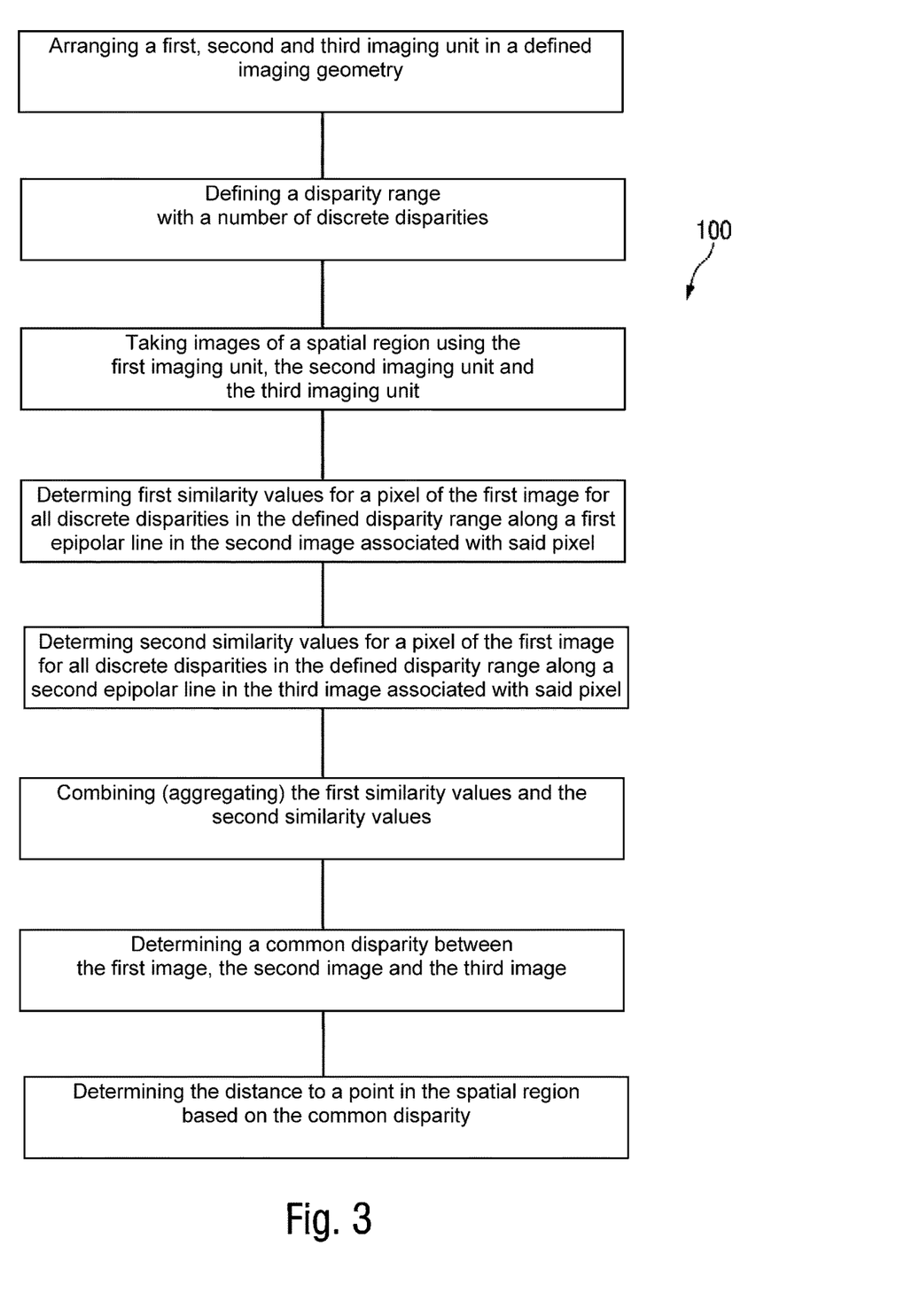
FIG. 3 shows a block diagram of a method according to an example embodiment.

FIG. 3 shows a block diagram of a method according to an example embodiment. The method in its entirety is denote here with reference numeral 100.

In a first step 102, a first, second and third imaging unit are arranged in a defined imaging geometry in which the imaging units form an isosceles triangle. This step may also include a calibration of the imaging units.

In a next step 104, a disparity range with a number of discrete disparities is determined. The disparity range indicates the range of possible disparities between two pairs of images. The disparity range can be specified by a minimum and a maximum disparity, wherein the discrete disparities are corresponding intermediate values with a defined distance in between. For example, if the minimum disparity is zero and the maximum disparity is ten pixels, the disparity range, at a defined distance of one pixel, includes all pixels between the minimum and the maximum disparity.

In step 106, the spatial region is imaged, wherein a first image is taken with the first imaging unit, a second image is taken with the second imaging unit, and a third image is taken with the third imaging unit. During imaging, each point in the spatial region is uniquely assigned to a pixel of the image sensors of the first, second and third imaging unit. Accordingly, at a defined point in time, there are three individual offset images of the spatial region. The step may further include rectification of the images.

In step 108, first similarity values for a pixel of the first image are determined for all discrete disparities in the defined disparity range along a first epipolar line in the second image associated with the pixel. In this step, a comparison between the first and the second image is made. The similarity of a pixel is determined with respect to the same pixel in the second image and all other pixels starting from the same pixel in the entire disparity range. Due to the epipolar geometry, a corresponding pixel can only appear along the epipolar line, so that the search is limited to this area. The first similarity values include for a reference pixel in the first image for all discrete disparities a similarity value that describes the similarity of the reference pixel to the respective pixel in the second image at the distance of the discrete disparity.

In other words, at first, it is determined how similar the pixel of the first image is compared to the corresponding pixel of the second image. Then the similarity of the first pixel to the neighboring pixel of the corresponding pixel is determined. This process is repeated until similarity values for all discrete disparities up to the maximum possible disparity have been determined.

When determining the similarity values, not only are the individual pixels compared to each other to determine their similarity, but the immediate surroundings of the pixel are also taken into account. Therefore, a classic block-matching procedure may be applied, in which the sum of the absolute (SAD values) or quadratic (SSD values) differences are calculated for every possible disparity, for example in 7×7 window sections, between the first image and the second image. These values are a measure of the similarity of the window sections considered. The more similar the window sections are, the lower the similarity value. The smallest possible similarity value in this case is zero and represents identical window sections.

In step 110, second similarity values are determined by applying the process described in step 108 to the remaining image pair. The second similarity values are therefore also, for example, SAD or SSD values calculated for any disparity between the first image and the third image. The second similarity values can be determined after the first similarity values, or in parallel.

Once the first and second similarity values have been determined, they are appropriately combined (aggregated) in step 112. This can be achieved by applying a simple arithmetic operation to the first and second similarity values of the same disparity. In various embodiments, the corresponding similarity values can be added together to obtain the combined similarity values. It is understood that normally not integer disparities are used, but subpixel disparities are used instead.

After combining the similarity values, the disparity is determined. Finding the disparity involves searching for a minimum in the combined similarity values. Since there can be one or more smallest values, the search is not only for the smallest value, but for the point where there is a clear minimum. To find such a position, for example, a threshold value relative to the smallest value can be used. If the smallest value is 1000 and the threshold 20%, all values below 1200 are determined. Two values below this threshold are also allowed, provided they are adjacent to each other. If this condition cannot be met, no assignment is possible.

Since the similarity values of the first and second and the first and third images should lead to the same disparities due to the defined imaging geometry at the same object distances, a common disparity between the first image, the second image, and the third image is consequently determined in step 114 on the basis of the combined similarity values for the at least one pixel.

Subsequently, in step 116, the distance is determined for the at least one pixel based on the common disparity. Here, the distance is calculated by triangulation from the known imaging geometry and the common disparity in a known manner.

It goes without saying that the above procedure cannot be applied to a single pixel of the image, but that distance information can be determined for each pixel. Furthermore, it is conceivable that distance information may only be determined for a defined pixel area of the first image in order to limit the evaluation to a relevant area.

Thus, steps 108 to 116 are repeated for each further relevant pixel or pixels of the first image until a corresponding distance information has been determined for all relevant pixels.

It is understood that the procedure can include further preparation and follow-up steps in addition to those described here. Likewise, the steps do not have to be executed sequentially. In various embodiments, some steps, such as determining the first similarity values and the second similarity values, can be executed in parallel. In addition, it is conceivable that not single images are taken, but continuous image sequences are considered from which specific individual images are extracted.

Figure 4:
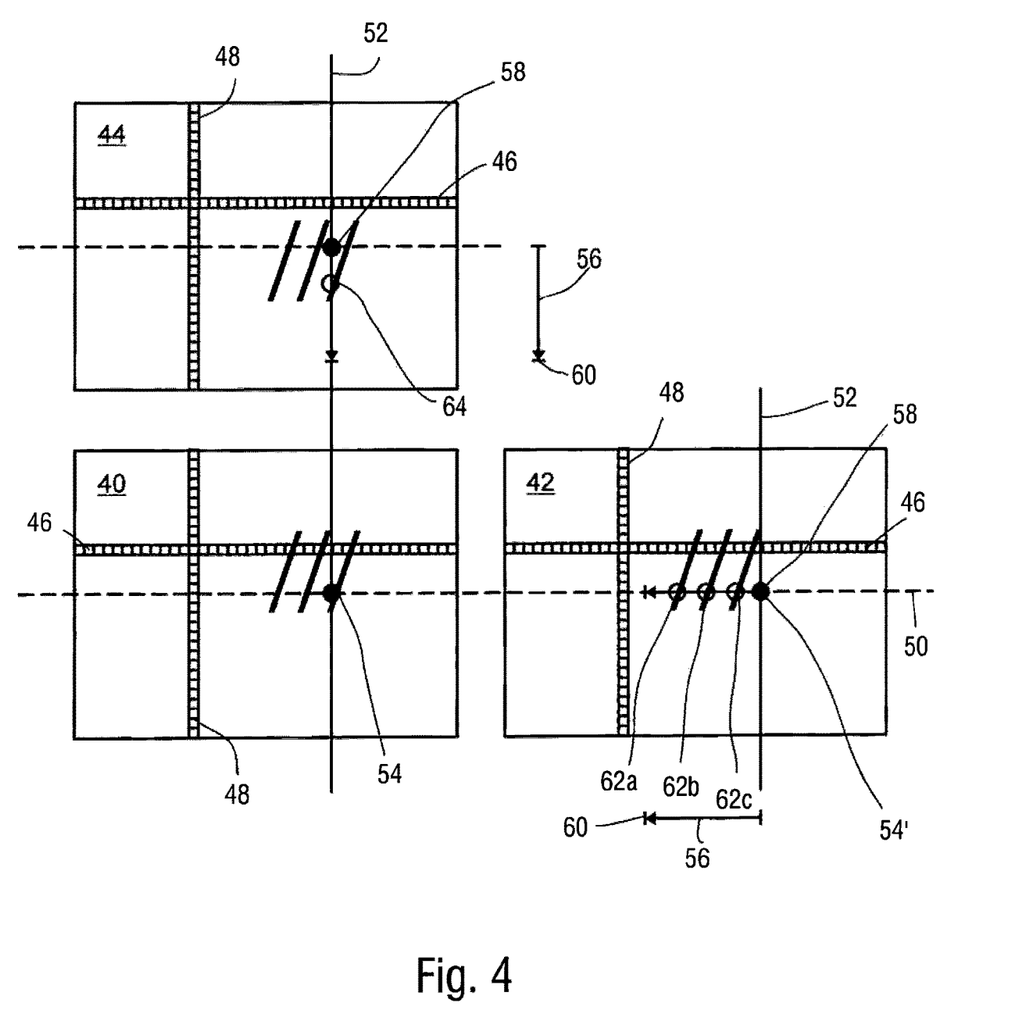
FIG. 4 shows a schematic view of three images of the first imaging unit, the second imaging unit, and the third imaging unit.

FIG. 4 shows an example of a first image 40, a second image 42 and a third image 44. The first image 40 corresponds to an image taken with the first imaging unit 12, the second image 42 corresponds to a simultaneous image taken with the second imaging unit 14, and the third image 44 corresponds to another simultaneous image taken with the third imaging unit 16. All three images show an image of the same spatial region in which an object is arranged, which is here, as an example, indicated by three slashes "///".

Each image 40, 42, 44 corresponds to a pixel matrix with a multitude of pixel lines 46 and a multitude of pixel columns 48. In the example embodiment shown here, the image sensors of the imaging units 12, 14, 16 have the same resolution and identical pixel columns and pixel lines. The first image 40, the second image 42 and the third image 44 thus have an equal number of pixel lines 46 and pixel columns 48.

Each point of the spatial region is assigned to a pixel of the pixel matrix and visible points of the spatial region are mapped on the pixel matrix. Since the imaging units are offset to each other, the same point of the spatial region on the first image 40, the second image 42 and the third image 44 can be mapped to different pixels of the pixel matrix of the respective image.

Reference numerals 50 and 52 denote epipolar lines that result from the defined imaging geometry. In addition to the physical alignment of the three imaging units, further calibration steps may be necessary, especially rectification of the image to obtain the desired epipolar geometry. After the alignment, the first epipolar line 50 runs perpendicular to the second epipolar line 52.

By correspondence analysis, correspondences in the second image 42 and the third image 44 for the pixels of the first image 40 are searched, in order to determine subsequently the disparity of depicted objects in the images. This is shown below using pixel 54 of the first image 40 as an example.

Due to the epipolar geometry in the second image 42, a correspondence to pixel 54 must lie on the epipolar line 50. Likewise, a correspondence to pixel 54 in the third image 44 must be on the second epipolar line 52. Not all pixels along the epipolar line 50, 52 have to be considered, but only those within a defined disparity range 56.

The disparity range 56 extends here from a pixel 58 corresponding to pixel 54 in the second and third images along the first and second epipolar lines 50, 52, respectively, and is limited by a maximum disparity 60. The search for possible correspondences is limited to the defined disparity range 56. In the example embodiment shown here, each pixel within the disparity range 56 describes a possible discrete disparity. For the search for correspondences, starting from the corresponding pixel 58 along the first or second epipolar line 50, 52, each pixel in the disparity range 56 to the maximum disparity 60 is compared with the reference pixel 54. Not only the respective pixels themselves can be considered, but also their surroundings. In other words, a so-called block matching procedure can be applied.

From the example shown here, it can be seen that when comparing the first image 40 with the second image 42, three pixels 62a, 62b, 62c within the disparity range 56 provide the same similarity measures for pixel 54. Therefore, the search for correspondence within the disparity range 56 provides no clear result in this case.

The search for correspondences in the first image 40 and in the third image 44, on the other hand, provides a clear result. For the pixel 54 along the second epipolar line 52 in the third image 44, there is only one possible correspondence 64; in other words, while for pixel 54 a correspondence analysis with the second image 42 would lead to assignment problems, a correspondence analysis between the first image 40 and the third image 44 would provide a clear solution.

The method according to the disclosure suggests combining the similarity values determined in connection with the search for correspondences in the first image 40, the second image 42 and the third image 44 before the similarity values are further evaluated. The aggregation between the similarity values is explained in more detail below using FIG. 5 and FIG. 6.

Figure 5:
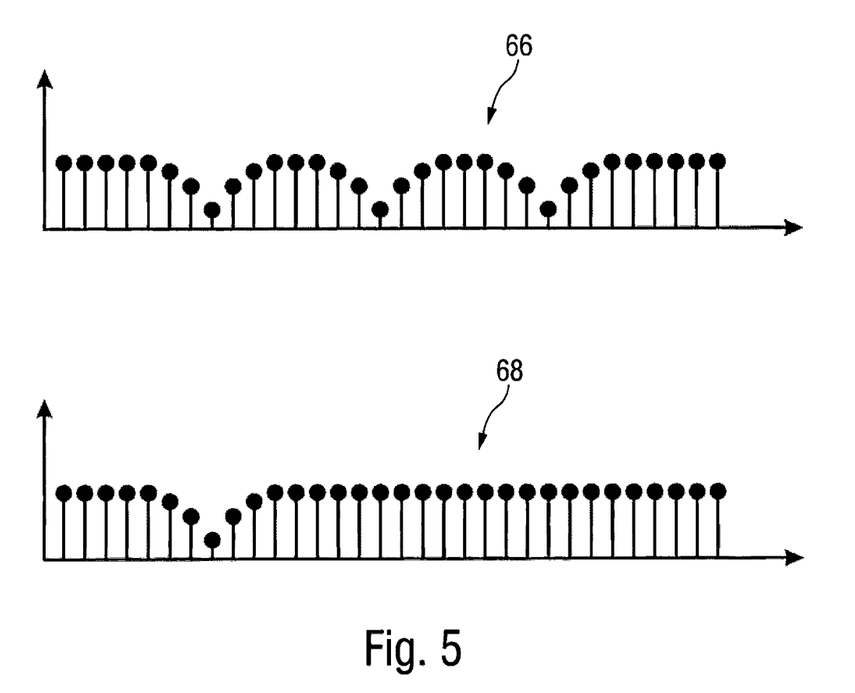
FIG. 5 shows a diagram view of first similarity values and second similarity values.

In FIG. 5, first similarity values 66 and second similarity values 68 are plotted in a first diagram and a second diagram, which were determined for a pixel 54 of the first image 40 during the search for possible correspondences in the second image 42 and the third image 44. In the upper diagram, the similarity values for a pixel 54 along the first epipolar line 50 are plotted and in the lower diagram, the similarity values for the same pixel 54 along the second epipolar line 52 are plotted. In total, similarity values along the x-axis were plotted here for thirty-two discrete disparities. The lower the respective value, the more similar the first pixel 54 and the considered pixel are. According to the example in FIG. 4, the upper diagram shows three minima. In other words, for three specific disparities, the similarity measures between the pixels under consideration are the smallest. Therefore, it is not possible to determine the disparity clearly from these similarity values. In the lower diagram 68, on the other hand, there is exactly one minimum, i.e. for a concrete disparity the similarity between the observed pixels is the smallest.

The method according to the disclosure proposes combining the first similarity values 66 and the second similarity values 68 with each other, so that the similarity values 66, 68 are already combined before an extreme value search. An example of this is shown in FIG. 6.

Figure 6:
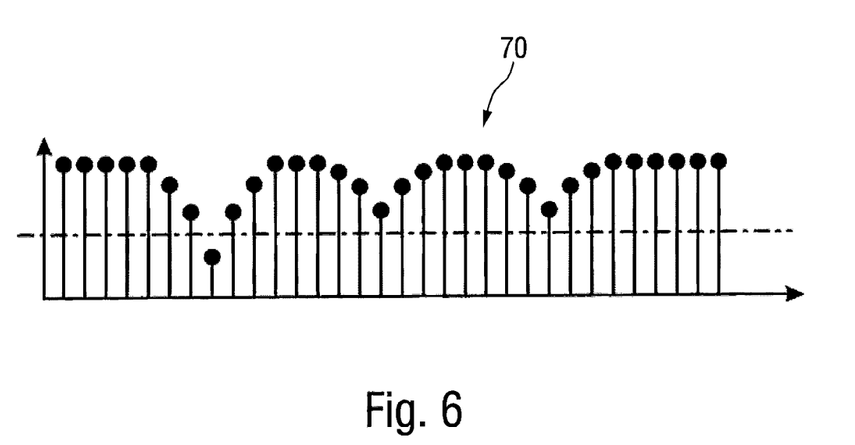
FIG. 6 shows a diagram view of combined similarity values.

FIG. 6 shows the combined similarity values 70 of the similarity values shown in FIG. 5. The aggregation is achieved by a simple addition of the first similarity values 66 and the second similarity values 68 that have been previously determined from the image pairs. In this way, extreme values are highlighted more clearly, as there is a larger information base for the same information. As can be seen from FIG. 6, the combined similarity values only have a clear minimum at one position. The method according to the disclosure is thus able to determine clear and correct distance information for sufficiently pronounced structures in the image almost independently of their orientation.

Figure 7:
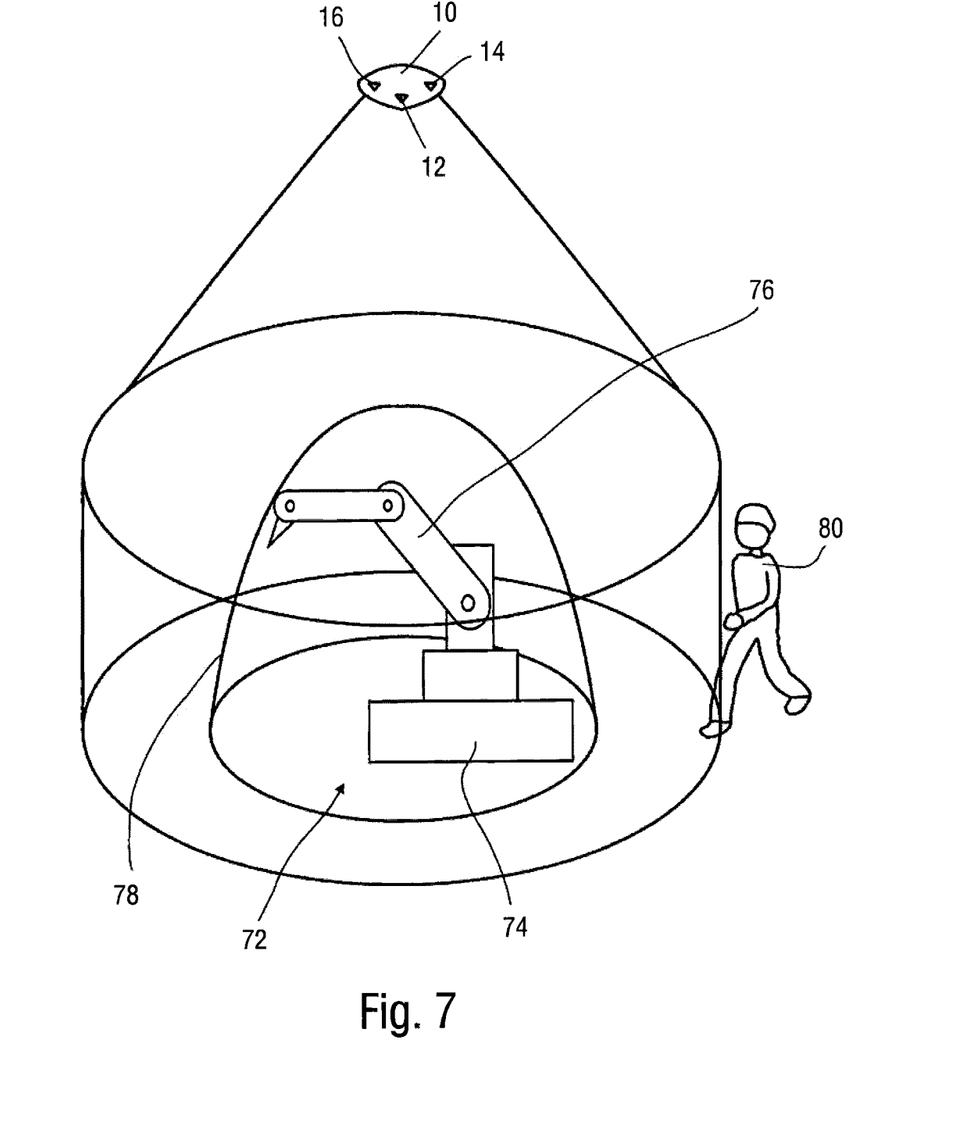
FIG. 7 shows an application scenario of an apparatus and method according to an example embodiment.

Finally, FIG. 7 shows an application scenario of an apparatus and a method according to an example embodiment.

In FIG. 7, an apparatus 10 according to the disclosure is used to protect a technical installation 72. The technical installation 72 is indicated here by an industrial robot 74. The robot 74 comprises a manipulator 76, which can move freely in space and whose movement range defines a hazardous area 78 of the technical installation 72. Within the hazardous area 78, the movement of the manipulator 76 may pose a danger to an operator 80, so that when entering the hazardous area 78 of the technical installation 72, the manipulator 76 must be transferred into a state that is safe for the operator 80.

In this example embodiment, the apparatus is placed above the technical installation 72, for instance on a ceiling of an assembly hall, so that the imaging units 12, 14, 16 can take images of the spatial region around the technical installation 72.

In the manner described above, the apparatus 10 can determine distance information for the spatial region. Certain areas, such as here the movement area, can be excluded from the determination of the distance information. As soon as an operator enters the spatial region around the technical installation 72, the distance information for this area determined by the apparatus 10 changes. By continuously determining distance information and registering changes, the apparatus 10 is able to detect a person or object within the spatial region.

The apparatus 10 can thus signal the entry of a person into the spatial region based on the distance information determined and, for example, transfer the technical installation into a safe state via a safety means connected to the apparatus 10 (not shown here). The safety means may, for example, be an ordinary safety-switching device or a safe control system that are configured to ensure safety in a known manner, for example by switching off the technical installation 72.

The method allows the apparatus, including the image processing device, to be integrated in a housing, so that the apparatus can directly interact with the safety means as a safe sensor. This is possible because the method can be ported to hardware specialized for linear processing.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The phrase at least one of A, B, and C should be construed to mean a logical (A OR B OR C), using a non-exclusive logical OR, and should not be construed to mean "at least one of A, at least one of B, and at least one of C."

What is claimed is:

1. A method for determining distance information, the method comprising:
    defining a disparity range having a number of discrete disparities;
    taking a first image of a spatial region with a first imaging unit, a second image of the spatial region with a second imaging unit, and a third image of the spatial region with a third imaging unit, wherein the first imaging unit, the second imaging unit, and the third imaging unit are arranged in a defined imaging geometry in which the imaging units form an isosceles triangle;
    determining first similarity values for at least one pixel of the first image for all discrete disparities in the defined disparity range along a first epipolar line associated with the pixel in the second image;
    determining second similarity values for the at least one pixel of the first image for all discrete disparities in the defined disparity range along a second epipolar line associated with the pixel in the third image;
    combining the first similarity values with the second similarity values;
    determining a common disparity between the first image, the second image, and the third image for the at least one pixel based on the combined similarity values; and
    determining a distance to a point within the spatial region for the at least one pixel from the common disparity and the defined imaging geometry.

2. The method of claim 1, further comprising:
    carrying out a scene analysis to detect foreign objects in a hazardous area of a technical installation based on the distance to the point within the spatial region; and
    transferring the technical installation into a safe state in response to detection of a foreign object.

3. The method of claim 1 further comprising:
    based on the distance to the point within the spatial region, selectively detecting a foreign object within the spatial region; and
    in response to detection of the foreign object, switching off a robot operating within the spatial region.

4. The method of claim 1, wherein the first imaging unit, the second imaging unit, and the third imaging unit form an isosceles, right-angled triangle in the defined imaging geometry.

5. The method of claim 1, wherein:
    the first similarity values are determined by comparing the at least one pixel of the first image and its surroundings with each pixel and its surroundings within the defined disparity range along the first epipolar line in the second image, and
    the second similarity values are determined by comparing the at least one pixel of the first image and its surrounding with each pixel and its surroundings within the defined disparity range along the second epipolar line in the third image.

6. The method of claim 5, further comprising determining, for comparison of the at least one pixel and its surroundings with each pixel and its surroundings along the first epipolar line and the second epipolar line, a sum of at least one of absolute differences and quadratic differences.

7. The method of claim 1, wherein the first similarity values and the second similarity values are added together.

8. The method of claim 1, wherein determining the common disparity for the at least one pixel includes an extreme value search in the combined similarity values.

9. The method of claim 8, wherein the extreme value search is a search for a minimum.

10. The method of claim 1, wherein the first image, the second image, and the third image are transformed relative to each other such that the first epipolar line extends along a first axis and the second epipolar line extends along a second axis perpendicular to the first epipolar line.

11. The method of claim 10, wherein:
    the first image, the second image, and the third image each comprise an equal number of pixel lines and an equal number of pixel columns,
    the first epipolar line extends in the second image along a pixel line that corresponds to the pixel line of the first image in which the at least one pixel is located, and
    the second epipolar line extends in the third image along a pixel column that corresponds to the pixel column of the first image in which the at least one pixel is located.

12. The method of claim 1, wherein a common disparity is determined for all pixels of the first image.

13. The method of claim 1, wherein a common disparity is determined for a defined number of pixels of the first image only.

14. The method of claim 1, further comprising:
    determining third similarity values for at least one further pixel of the second image for all discrete disparities in the defined disparity range along a first epipolar line in the first image associated with the further pixel;
    determining fourth similarity values for the at least one further pixel of the second image for all discrete disparities in the defined disparity range along a second epipolar line associated with the further pixel in the third image; and
    determining further distance information from the third and fourth similarity values.

15. An apparatus for determining distance information from images of a spatial region, the apparatus comprising:
    a first imaging unit configured to take a first image of the spatial region;
    a second imaging unit configured to take a second image of the spatial region;
    a third imaging unit configured to take a third image of the spatial region; and an image processing unit configured to determine first similarity values and second similarity values for at least one pixel of the first image within a defined disparity range having a number of discrete disparities,
wherein the first imaging unit, the second imaging unit, and the third imaging unit are arranged in a defined imaging geometry in which the imaging units form an isosceles triangle,
wherein the image processing unit is configured to:
determine the first similarity values for the at least one pixel for all discrete disparities in the defined disparity range along a first epipolar line associated with the pixel in the second image, and
determine the second similarity values for the at least one pixel for all discrete disparities in the defined disparity range along a second epipolar line associated with the pixel in the third image, and
wherein the image processing unit is further configured to:
combine the first similarity values with the second similarity values,
determine a common disparity for the at least one pixel between the first image, the second image, and the third image based on the combined similarity values, and
determine a distance to a point within the spatial region for the at least one pixel from the common disparity and the defined imaging geometry.

16. The apparatus of claim 15, wherein the image processing unit is an FPGA.

17. The apparatus of claim 15, further comprising:
an evaluation unit configured to carry out a scene analysis to detect foreign objects in a hazardous area of a technical installation based on the distance to the point within the spatial region; and
safety equipment configured to transfer the technical installation into a safe state in response to the evaluation unit detecting a foreign object.

18. The apparatus of claim 15, wherein the first imaging unit, the second imaging unit, and the third imaging unit are arranged in a common housing.

19. A non-transitory computer-readable medium comprising instructions including:
arranging a first imaging unit, a second imaging unit, and a third imaging unit in a defined imaging geometry, in which the imaging units form an isosceles triangle;
defining a disparity range having a number of discrete disparities;
taking a first image of a spatial region with the first imaging unit, a second image of the spatial region with the second imaging unit, and a third image of the spatial region with the third imaging unit;
determining first similarity values for at least one pixel of the first image for all discrete disparities in the defined disparity range along a first epipolar line associated with the pixel in the second image;
determining second similarity values for the at least one pixel of the first image for all discrete disparities in the defined disparity range along a second epipolar line associated with the pixel in the third image;
combining the first similarity values with the second similarity values;
determining a common disparity between the first image, the second image, and the third image for the at least one pixel based on the combined similarity values; and
determining a distance to a point within the spatial region for the at least one pixel from the common disparity and the defined imaging geometry.

20. The computer-readable medium of claim 19 further comprising instructions including:
based on the distance to the point within the spatial region, selectively detecting a foreign object within the spatial region; and
in response to detection of the foreign object, switching off a robot operating within the spatial region.

* * * * *